US005586126A

United States Patent [19]
Yoder

[11] Patent Number: 5,586,126
[45] Date of Patent: Dec. 17, 1996

[54] SAMPLE AMPLITUDE ERROR DETECTION AND CORRECTION APPARATUS AND METHOD FOR USE WITH A LOW INFORMATION CONTENT SIGNAL

[76] Inventor: John Yoder, 2138 Alameda Ct., San Jose, Calif. 95126

[21] Appl. No.: 175,733

[22] Filed: Dec. 30, 1993

[51] Int. Cl.$^{6}$ .................................................. G06F 11/00
[52] U.S. Cl. .............................................. 371/30; 371/67.1
[58] Field of Search .............................. 371/30, 31, 67.1; 395/2.35, 2.37, 2.1, 2, 2.38, 2.42; 381/46, 50

[56] References Cited

U.S. PATENT DOCUMENTS

| | | | |
|---|---|---|---|
| 3,611,149 | 10/1971 | Kimball | 325/323 |
| 3,740,476 | 6/1973 | Atal . | |
| 3,903,366 | 9/1975 | Coulter . | |
| 4,039,754 | 8/1977 | Lokerson . | |
| 4,054,863 | 10/1977 | Goodman et al. | 340/146.1 R |
| 4,497,055 | 1/1985 | Hoshino et al. | 371/31 |
| 4,639,920 | 1/1987 | Kaneko | 371/31 |
| 4,672,669 | 6/1987 | Desblache et al. | 381/46 |
| 4,763,293 | 8/1988 | Takei et al. | 364/723 |
| 4,803,684 | 2/1989 | Kozuki et al. | 371/31 |
| 4,825,440 | 4/1989 | Heitmann et al. | 371/31 |
| 4,829,522 | 5/1989 | Nishiguchi | 371/31 |
| 4,829,553 | 5/1989 | Shindo et al. | 338/309 |
| 4,907,277 | 3/1990 | Callens et al. | 371/31 |
| 5,148,431 | 9/1992 | Hayashi | 371/5.5 |
| 5,164,915 | 11/1992 | Blyth | 365/45 |
| 5,241,494 | 8/1993 | Blyth et al. | 365/45 |
| 5,268,655 | 12/1993 | Dong | 371/16 |
| 5,313,472 | 5/1994 | Hara | 371/31 |
| 5,335,019 | 8/1994 | Herz et al. | 371/67.1 |
| 5,335,312 | 8/1994 | Mekata et al. | 395/2.35 |
| 5,341,457 | 8/1994 | Hall, II et al. | 395/2.35 |
| 5,355,431 | 10/1994 | Kane et al. | 395/2.35 |

FOREIGN PATENT DOCUMENTS

| | | | |
|---|---|---|---|
| 1-236893 | 9/1989 | Japan | H04Q 1/457 |

OTHER PUBLICATIONS

A. R. Greenwood "Measurements of vocal tract shapes using magnetic resonance imaging" IEEE 1992 pp. 553-560.

Marsha A. Zlatin & Roy A. Koenigsknecht, "Development of the Voicing Contrast: A Comparison of Voice Onset Time in Stop Perception and Production," *Journal of Speech and Hearing Research*, vol. 19, pp. 93–111 (1976).

(List continued on next page.)

*Primary Examiner*—Robert W. Beausolier, Jr.
*Assistant Examiner*—Albert DeCady
*Attorney, Agent, or Firm*—Haverstock & Associates

[57] ABSTRACT

An amplitude error detection and correction circuit apparatus and method can be used to detect and correct errors in signal amplitudes of a low information content signal during playback or transmission. The difference values dS/dt between the amplitudes of each sample and its neighboring samples are analyzed and compared to a maximum difference value $dS_{max}/dt$. If the difference values dS/dt for a sample exceed the maximum difference value $dS_{max}/dt$ then the sample amplitude is elided or adjusted during playback or transmission to minimize distortion within the signal. The maximum difference value $dS_{max}/dt$ is determined by either the known characteristics of the signal type, analyzing a predetermined number of samples around the sample or grouping the data as it is input and storing or transmitting a maximum difference value for each group. The signal can be analyzed during the input of the signal, if the signal is accessible at this time, and the maximum difference value $dS_{max}/dt$ for each group of samples can be stored or transmitted with the signal. During output or transmission of the signal, the difference values dS/dt can be analyzed and any errors can be detected and then elided or adjusted. The signal can also be analyzed during output or transmission of the signal, by using a known maximum difference value or a moving reference frame which compares each sample's difference value dS/dt with the difference values of a predetermined number of samples both prior and subsequent to each sample.

26 Claims, 12 Drawing Sheets

OTHER PUBLICATIONS

Larry E. Humes, "Masking of Tone Bursts By Modulated Noise in Normal, Noise–Masked Normal, and Hearing–Impaired Listeners," *Journal of Speech and Hearing Research,* vol. 33, pp. 3–8 (Mar. 1990).

William S. Winholtz & Lorraine Olsen Ramig, "Vocal Tremor Analysis With the Vocal Demodulator," *Journal of Speech and Hearing Research,* vol. 35, pp. 562–573 (Jun. 1992).

Dennis H. Klatt, "Voice Onset Time, Frication, and Aspiration in Word–Initial Consonant Clusters," *Journal of Speed and Hearing Research,* vol. 18, pp. 686–706 (1975).

F. Klingholz & F. Martin, "Speed Wave Aperiodicities at Sustained Phonation in Functional Dysphonia," *Folia phonit,* vol. 35, pp. 322–327, 1983.

M. Morávek, P. Bureš & I. Krekule, "Temporal Pattern of Vocalized and Silent Segments in Loud Reading," *Folia phoniat,* vol. 29, pp. 146–153 (1977).

TYPICAL VOWEL SPEECH SPECTRUM

TYPICAL STOP CONSONANT PLUS VOWEL SYLLABLE SPECTRUM

TYPICAL UNVOICED FRICATIVE PLUS VOWEL SYLLABLE SPECTRUM

LOCAL MAXIMA $$\Delta Smax = \begin{cases} dSn-/dt : dSn-/dt < dSn+/dt \\ dSn+/dt : dSn+/dt < dSn-/dt \end{cases}$$

LOCAL MINIMA

SAMPLE AMPLITUDE ERROR DETECTION AND CORRECTION APPARATUS AND METHOD FOR USE WITH A LOW INFORMATION CONTENT SIGNAL

FIELD OF THE INVENTION

This invention relates to the field of analysis, reproduction and error recognition of low information content signals. More particularly, this invention relates to the field of error recognition and correction of a low information content signal, such as aurally processed signals.

BACKGROUND OF THE INVENTION

A low information content signal is one in which if divided into parts, the size of each part determined by the nature of the signal, an error in the content of a single part or group of parts will not corrupt the signal so badly that it is not useful for its original purpose. This is in contrast to a high information content signal, such as a digital representation of a character, in which the change of one bit would alter the information of the representation in such a way that it would no longer be useful for its original purpose. A low information content signal; voice, sound or other, can be represented by a stream of samples. Each sample represents an amplitude value corresponding to the amplitude of the signal waveform over a known period of time. The time period represented by each sample is determined by the frequency at which the samples are taken. The value of each sample can then be stored and used to approximately reproduce the signal waveform. The smaller the sample period, the more samples that are used to represent the signal over the time period. This enables voice, sound or other information to be input and stored as a plurality of sample values which can be reproduced at a later time and used to reconstruct the original stream of information.

Generally, speech can be divided into two broad categories, voiced and unvoiced. The voiced sounds are products of larynx and vocal tract resonances which, interacting, form a series of frequency components called formants. FIG. 1 illustrates a plot of an energy versus frequency spectrum typical of the formants for a vowel. The important point to note in this figure is that the greatest energy is at the lowest or first formant. Therefore, when this component of speech is sampled the energy change between samples will be small compared to the energy per sample. The voiced sounds are vowels and voiced consonants such as 'z' and 'sh'. Most of speech energy and duration (excluding silences) is in the voiced components of speech.

The unvoiced part of speech consists of the combinations of plosives, stops, fricatives and silences that make up the unvoiced consonants. These unvoiced sounds, compared to the voiced sounds, are characterized by lower energy, higher frequency signals which are quasi-periodic to noisy and of short to moderate duration. The energy change between samples relative to the samples themselves is large in this component, but the samples themselves are generally small compared to the voiced components, therefore the actual changes per sample are comparable to the voiced component. FIG. 2 illustrates the spectra of a stop consonant plus vowel combination such as 'ba' or 'ka'. The vertical axis is frequency and the horizontal axis is time, while the density of the spectra indicates energy at that point. The noisy, low energy section from the time point −0.1 to the time point 0, represented by the reference numeral 21, is the breathy onset to the consonant noise burst at the time point 0. After the burst, from the time point 0 to the time point 0.1, represented by the reference numeral 22, the consonant's energy falls off in a quasi-periodic way to a brief silence. From the time point 0.1 to the time point 0.5, represented by the reference numeral 23, is the vowel portion. This section is very periodic with most of the energy at the lower frequencies.

FIG. 3 illustrates the spectra of an unvoiced fricative plus vowel combination such as 'sa'. From the time point −0.2 to the time point 0, represented by the reference numeral 31, is the consonant portion characterized by a high frequency, low energy noise component over a lower frequency, higher energy quasi-periodic component. The vowel portion, from the time period 0 to the time period 0.3, represented by the reference numeral 32, is, as above, periodic with most of the energy in the lower frequency component. These spectra also illustrate that locally, within a time frame short in comparison to the speech component, the changes in energy or amplitude are similar.

A sampled stream of data is illustrated in FIG. 4. The waveform 1 which represents this stream of data is comprised of a number of samples, each having an amplitude value and representing a fixed period of time. Each sample 2 is an impulse containing an energy level which is represented by the amplitude of the sample. The amplitude of each sample is determined from its height above the zero or bottom line 3. The waveform is typically centered around the reference line 4, which usually represents an analog ground level, but can be determined to represent any level. The advantage of using analog ground as the reference level 4 is that if the waveform 1 travels both above and below ground, a positive amplitude can be used to represent amplitudes which are both above and below the ground or reference level 4. For example, if the reference level 4 is set to equal a sample having an amplitude of 100, any sample having an amplitude greater than 100 will be above ground level and any sample having an amplitude less than 100 will be below ground level. The reference level 4 can be determined and programmed to represent any level, depending on the application. The difference between the reference level 4 and the zero line 3 must be great enough to accommodate the amplitude level which will be farthest below the reference level 4 for the specific application.

Low information content signals include signals or data which represent such things as voice, music, sound, handwriting, and are sampled in such a way that the information content per sample is not critical to the information content of the overall sampled signal. The criteria used to determine whether or not the information content of a sample is critical is generally a function of the ratio of the sample period to the minimum amount of signal or data required to produce meaningful information.

A voice signal sampled according to the Niquist criteria is one type of a low information content signal. The Niquist theorem provides that a signal must be sampled at a rate at least twice the signal's highest frequency to prevent aliasing. Thus, if the maximum voice frequency was limited to 4 KHz, the sample frequency would be 8 KHz and each sample would represent a time period of 125 microseconds. To be generally recognizable as a voice segment, a signal of at least 100 milliseconds is required to constitute meaningful information. Therefore, the ratio of the sample period to the minimum amount of signal required for meaningful information is equal to 0.00125. In such a case, no isolated sample or samples is critical to the information content of the signal segment.

All meaningful aurally processed data can generally be represented by a low information content signal as described above. This is true because the quality of voice, music and sound reproductions is judged by the human ear, an imprecise instrument. Because of the limitations of the human ear, it is not necessary that each individual sample be reproduced at precisely the level of the original. But rather, all that is required is that enough of the amplitude of individual samples is produced or reproduced so that the human ear cannot detect a difference between the original and the produced or reproduced stream of sound and that the audibility of any errors is reduced to within the requirements of the specific application.

Storing a representation of a stream of sound can be accomplished within an integrated circuit (IC) memory, including but not limited to EEPROM, EPROM, ROM or RAM array, with each sample stored as an amplitude value within a cell or cells of the storage device. This stream of sound can be stored in an EEPROM or an EPROM as an analog amplitude. The reproduction quality of a stream of sound stored in a storage device is in part a function of the quality of the device used for storage. If the device used for storage contains bad or failing cells, when the stream of sound is reproduced from the stored data, the bad or failing cells will provide erroneous sample amplitudes which will unfavorably effect the reproduction of the stream of sound.

A typical application for such a storage device is recording a voice or sound message of a predetermined duration for playback at a later time. During record mode the storage device receives the voice message, samples it and stores the amplitudes of the samples so that the voice message can later be reproduced. During playback mode, when the user desires to listen to the voice message, the sample amplitudes are retrieved from the storage device and used to reconstruct the voice message. If any of the cells storing a sample amplitude have failed, then the voice message will not be reproduced accurately and may contain unwanted, extraneous noise.

Cell failure within a storage device can be caused by weak programming, leakage, shorts to a supply voltage level or a neighboring cell, a floating control gate, a shorted floating gate or other well known causes. Such a cell failure will keep a cell from programming to the amplitude of the sample taken. All of the causes of cell failure are not equally catastrophic in an analog storage device, so that determining what is to be a bad cell is typically done subjectively by correlating various listening and waveform tests with strobe levels in a test program. The number of failing cells allowed in a particular storage device is then a function of the yield necessary to insure adequate margins versus the sound quality level required by the market for the specific application in which the storage device is to be used.

Depending on the yield necessary and the sound quality requirements for the specific application in which the storage device is to be utilized, the manufacturer can determine how many bad cells within a storage device can be tolerated. Any storage devices having more than the allowed number of bad cells are discarded. The manufacturer can also sort the storage devices by the number of bad cells that they contain, so that the storage devices with the least number of bad cells can be used for applications requiring the highest quality and the storage devices with a higher number of bad cells will be used for applications where a lower level of quality can be tolerated. Storage devices with a high enough number of failed cells will be discarded.

The sound quality requirements of the market will generally increase with an increase in recording time, but to maintain adequate yields the number of bad cells which are allowed must increase linearly with the size of the storage device. If three failed cells are allowed on a storage device used to record a fifteen second stream of sound, then twelve failed cells will be allowed on a storage device used to record a sixty second stream of sound. Short duration devices are often used in novelty applications where the market does not require as high a level of quality. Longer duration devices are generally intended for a high repeat usage market, such as a message collector for cellular phones, where the market demands a higher level of quality.

A failing cell within a storage device can be determined by many test methods. One such test method is to program all of the cells in the storage device to a quiet level, represented by analog ground. The information in the storage device can then be listened to in the playback mode and any failing cells which produce an audible discrepancy can be detected. A failing cell will have a level different than the DC background by an amount determined to be unacceptably audible by the listening tests. This value can be considered the minimum audible change in amplitude level which is unacceptable. A diagram of such a failing cell is illustrated in FIG. 5. The amplitude of the failing cell 50 is much higher than the amplitude of the other cells, which have been programmed to a ground level. The change in level of the failing cell 50 is essentially an impulse and therefore it contains energy at all frequencies which is spread in time by output amplification and filtering. The larger the change in level, the greater the spread in time. If the change in level is high enough, an audible 'pop' can be heard by a listener, introducing an error into the stream of sound output from the storage device.

Other tests used to verify the functionality and quality of these storage devices. These tests determine whether each cell can be programmed to a sufficient level so that a voice or sound message can be reproduced to the level of quality demanded by the particular application in which the storage device is to be used and that no extraneous noise is introduced by a failed cell.

What is needed is a method and apparatus for recognizing and correcting any errors appearing during reproduction of a low information content signal so that circuits containing defective cells can still be used acceptably. What is further needed is a method in which the quality of the voice or sound reproduction from a storage device with failing cells can be improved so that storage devices which contain a high number of failing cells can be saved from being discarded and can be used to record and playback a stream of sound. What is also needed is a method in which the quality of the voice or sound reproduction from a storage device which contains a previously acceptable number of failing cells can be improved.

SUMMARY OF THE INVENTION

An amplitude error detection and correction circuit apparatus and method can be used to detect and correct errors in signal amplitudes of a low information content signal during playback or transmission. The difference values dS/dt between the amplitudes of each sample and its neighboring samples are analyzed and compared to a maximum difference value $dS_{max}/dt$. If the difference values dS/dt for a sample exceed the maximum difference value $dS_{max}/dt$ then the sample amplitude is elided or adjusted during playback or transmission to minimize distortion within the signal. The maximum difference value $dS_{max}/dt$ is determined by either the known characteristics of the signal type, analyzing a predetermined number of samples around the sample or grouping the data as it is input and storing or transmitting a maximum difference value for each group.

The signal can be analyzed during the input of the signal, if the signal is accessible at this time, and the maximum difference value $dS_{max}/dt$ for each group of samples can be stored or transmitted with the signal. During output or transmission of the signal, the difference values dS/dt can be analyzed and any errors can be detected and then elided or adjusted. The signal can also be analyzed during output or transmission of the signal, by using a known maximum difference value or a moving reference frame which compares each sample's difference value dS/dr with the difference values of a predetermined number of samples both prior and subsequent to each sample.

DETAILED DESCRIPTION OF THE PREFERRED EMBODIMENT

Reproductions of a low information content signals are only required to be reproduced such that the user or listener is able to understand data within the predetermined quality level required for the particular application. For some voice applications specifically, all that is required is that the listener can understand the reproduced voice message. For these reasons, precise reproduction of the low information content stream of data is not required, but rather a reproduction must only be within the level of quality requirements of the application, to be acceptable to a listener.

Low information content signals can be stored digitally or in analog form. In digital memory, groups of bits form the value for a sample. In analog memory each cell stores a sample's value. In the reproduction of the low information content stream of data, an isolated failing cell does not cause a problem because it does not program to the desired level, but rather an isolated failing cell will cause an error because the level of the failing cell is different enough from the levels of the cells around it to cause a discernable distortion of the output. Therefore, what must be recognized and corrected during output or transmission is a large disparity in the level of the amplitude stored in a cell as compared to the level of the amplitude stored in the cells within close relation to the specific cell.

Figure 11:
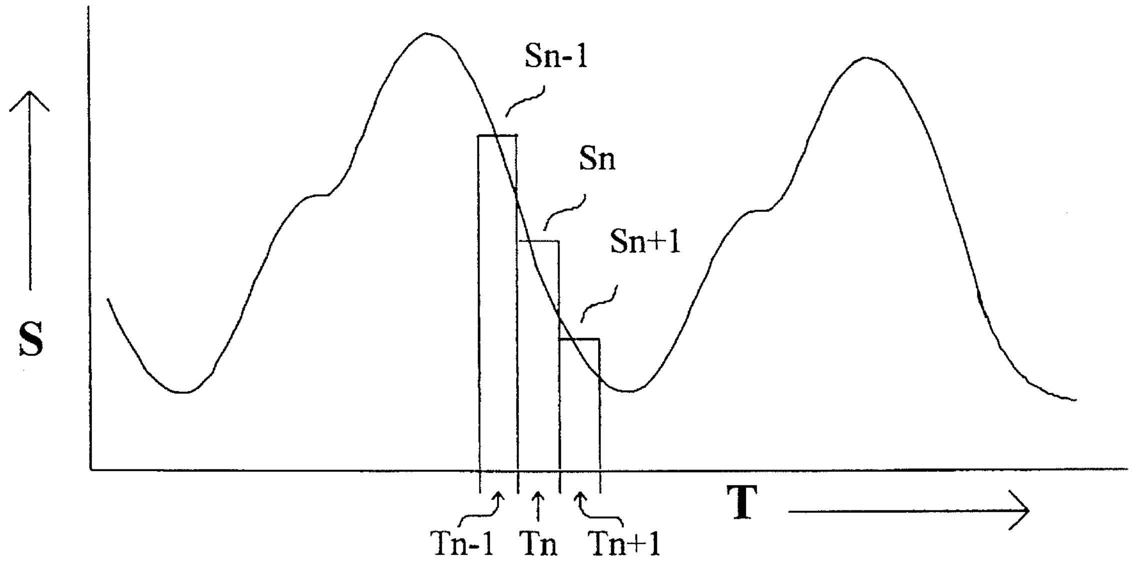
FIG. 11 illustrates sample amplitudes within a stream of data.
Figure 12:
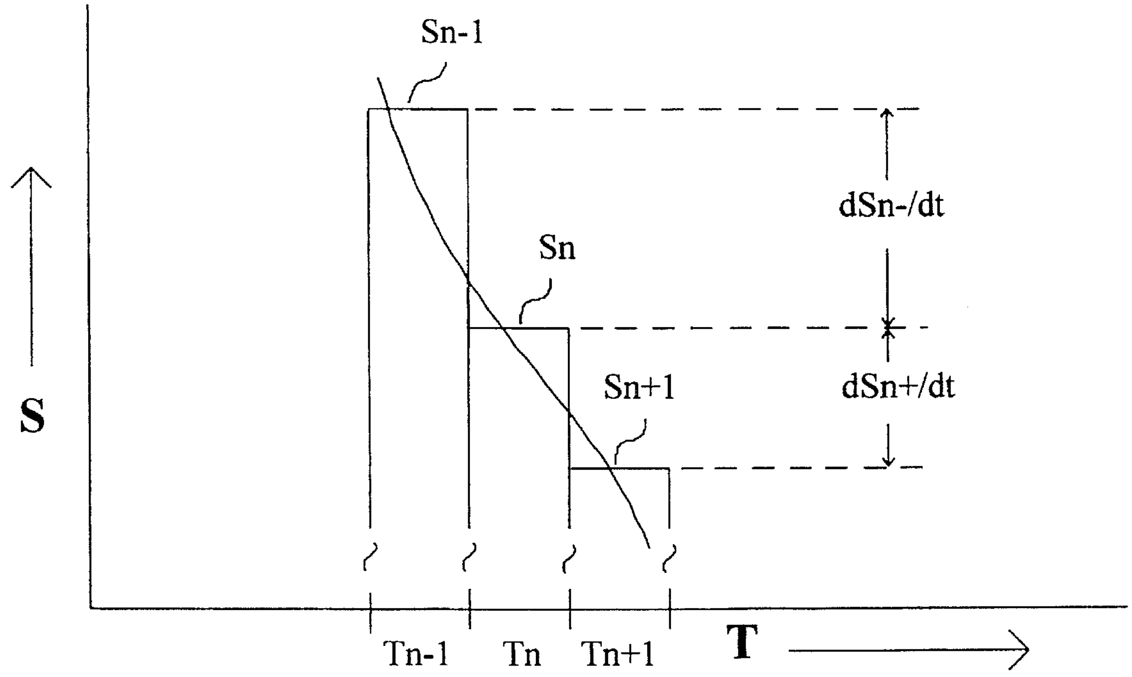
FIG. 12 illustrates sample amplitudes and their respective difference values within a stream of data.

In the preferred embodiment, the level or amplitude of a sample within a stream of voice data represents an energy level during a specific period of time. Therefore, what is stored and reproduced in a cell is the level of energy which was input to the apparatus during a specific sample period of time. By comparing the level or amplitude of one or more neighboring cells, a change in amplitude relative to a change in time is measured. A value dS/dt can be used to represent this change in amplitude relative to the change in time from one sample to the next. FIGS. 11 and 12 illustrate a reproduced waveform represented by a train of samples which were stored in a storage device. The difference, $dS_{n-}/dt$, between the amplitude of the samples $S_{n-1}$ and $S_n$ is illustrated. Each sample will have a difference value, dS/dt, with each of its neighbors. The difference value $dS_{n-}/dt$ is used to denote the left difference value between the sample and the previous sample and the difference value $dS_{n+}/dt$ is used to denote the right difference value between the sample and the subsequent sample. For example, the sample $S_n$ has a left dS/dt value which corresponds to the difference in amplitudes between the sample $S_n$ and its left-hand neighbor, the sample $S_{n-1}$, and a right dS/dt value which corresponds to the difference in amplitudes between the sample $S_n$ and its right-hand neighbor, the sample $S_{n+1}$.

By analyzing either the right-hand, left-hand or both difference values dS/dt of each sample during playback of the recorded stream of data and comparing them to a maximum acceptable level, failing cells which will cause an audible distortion can be detected. The maximum acceptable level for the difference value dS/dt can be determined by numerous methods.

One method that can be used to determine the maximum acceptable level of the difference value dS/dt is to choose a level which is determined by the characteristics of the type of data that is to be synthesized, recorded or reproduced. For instance, different levels of difference values can be used for voice, sound or music data. These levels are determined by the characteristics of each type of data and how fast typically, that the amplitude can change for data transmitted in that medium. For example, the acceptable level of the difference value dS/dt for voice data should be less than the acceptable level of the difference value dS/dt for music data, because within a stream of data representing music, the amplitude can change at a more rapid rate than the amplitude for a stream of data representing the human voice.

Another method that can be used to determine the maximum acceptable level of the difference value dS/dt is to compare the difference values for each respective sample with a value correlated to the maximum change in a reference frame or group of samples around the respective sample. The correlated value can be equal to or greater than the maximum change by an amount adequate for the specific application. The correlated value may be determined by adding a percentage to the greatest difference value within the frame, the percentage amount either predetermined or depending on stochastic processes during analysis of the data stream. The number of samples which constitute the frame or group is a predetermined number depending on the characteristics of the data and also the sample rate. For example, a frame of twenty samples, ten on each side of the sample of interest, can be used to compare their difference values dS/dt with the difference values of the sample being analyzed. The sample's right, left or both difference values dS/dt can be used in the comparison between each respective sample and its neighboring samples. Neighboring samples are samples within a predetermined range of the sample being analyzed and not limited to the samples directly adjoining the sample being analyzed. In the preferred embodiment adjacent samples are compared. If the difference value dS/dt for the respective sample being analyzed is more than the maximum difference value $dS_{max}$/dt for the samples within the frame, the respective sample is recognized as an error and its amplitude corrected.

In an alternate embodiment, the reference frame size, represented by N samples previous to and M samples subsequent to the sample being analyzed, may vary according to stochastic conditions within the frame or within the frame neighborhood. Such conditions would typically be average changes in amplitude, average amplitude, average frequency, fundamental frequency or formants or a changing sampling rate. The reference frame will constitute some number N samples previous to and M samples subsequent to the sample being analyzed. A person of ordinary skill in the art will recognize that the use of the reference frame is advantageous over the first method of determining the acceptable levels because it is more flexible and varies as the characteristics of the stream of data vary.

Figure 1:
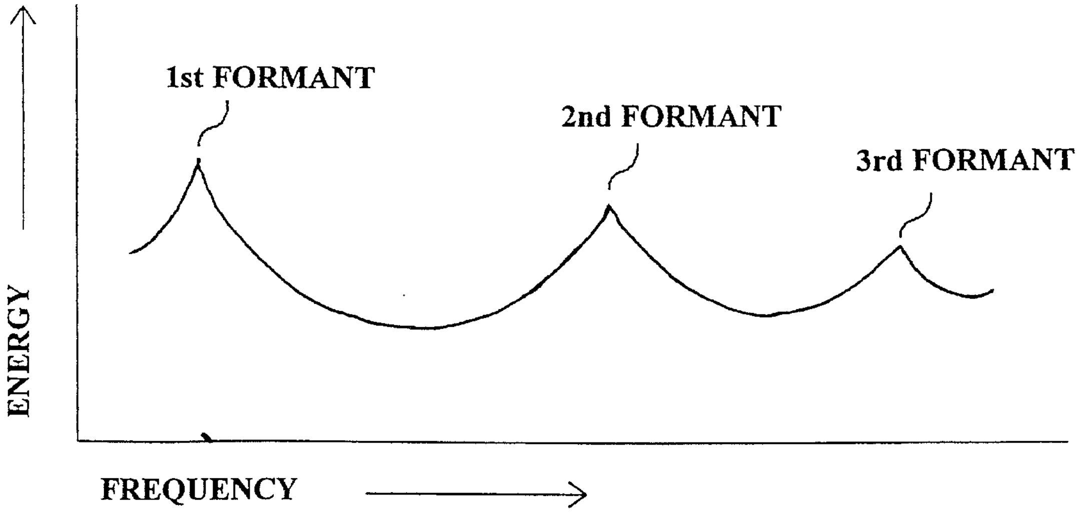
FIG. 1 illustrates a plot of an energy versus frequency spectrum typical of the formants of a vowel.
Figure 2:
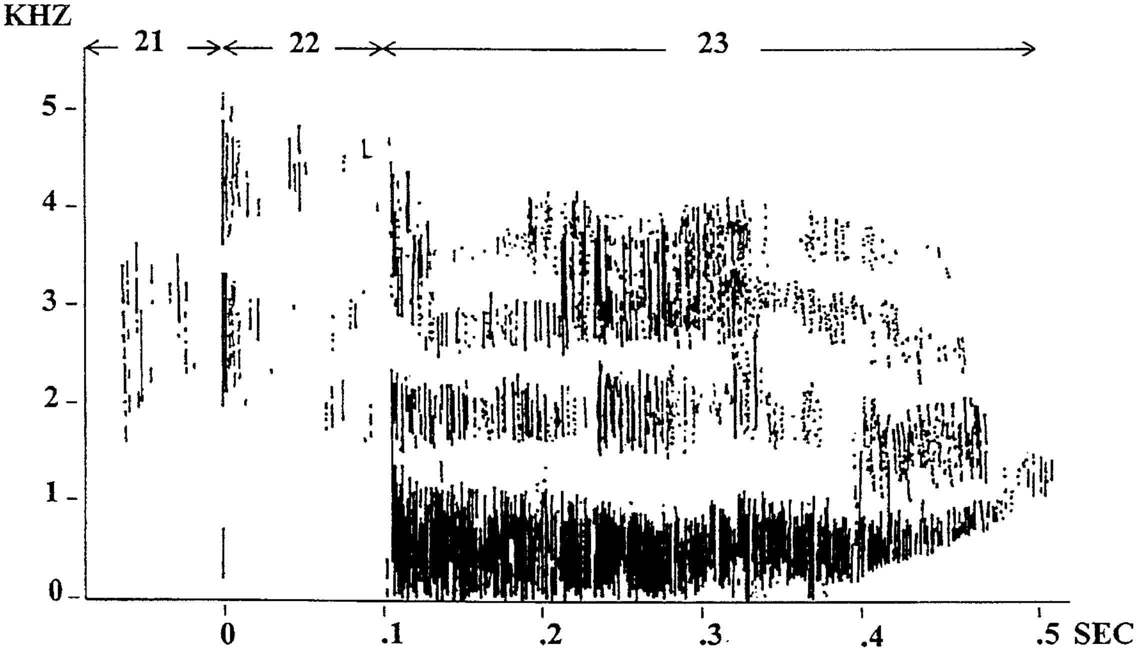
FIG. 2 illustrates a spectra of a stop consonant plus a vowel combination such as 'ba' or 'ka'
Figure 3:
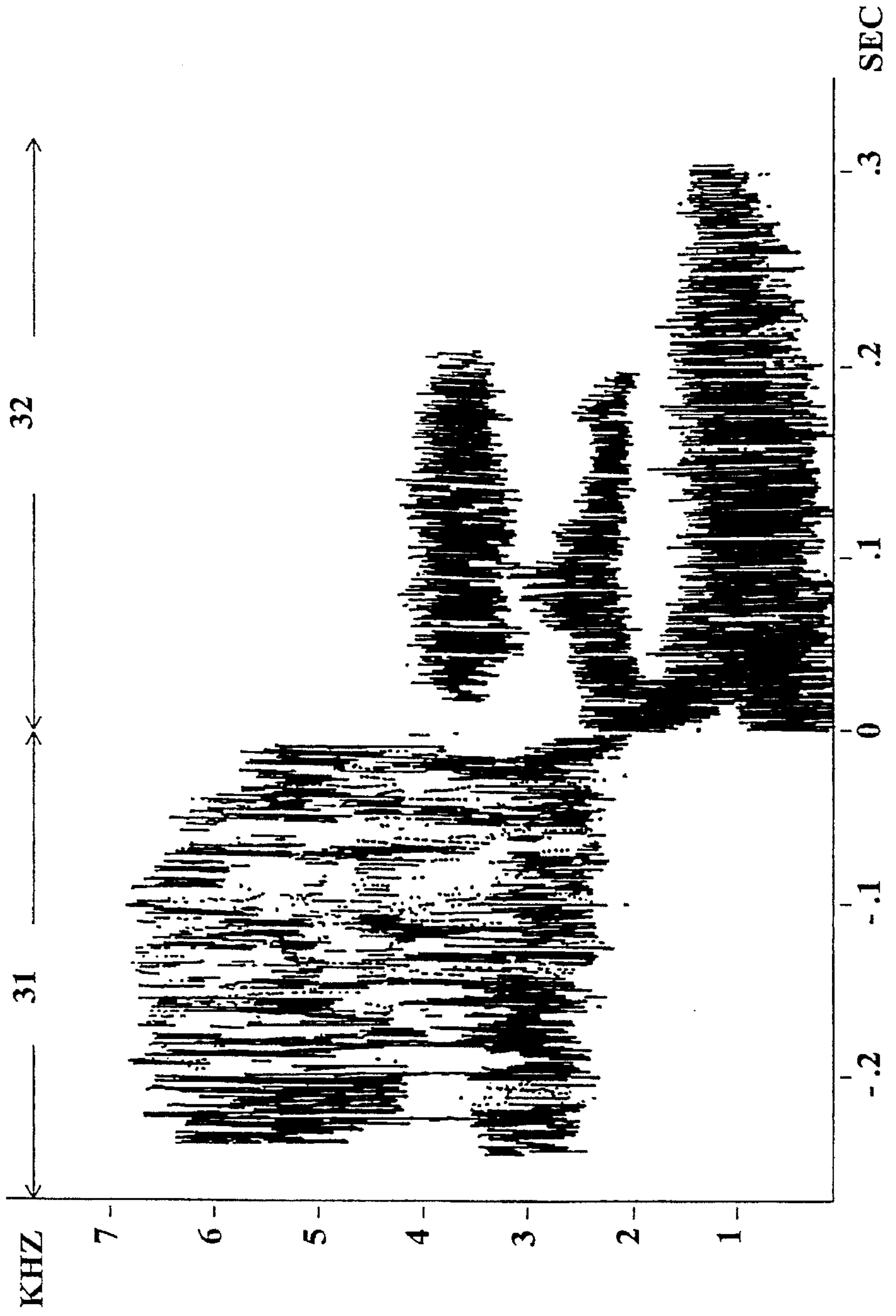
FIG. 3 illustrates a spectra of an unvoiced fricative plus vowel combination such as 'sa'.
Figure 4:
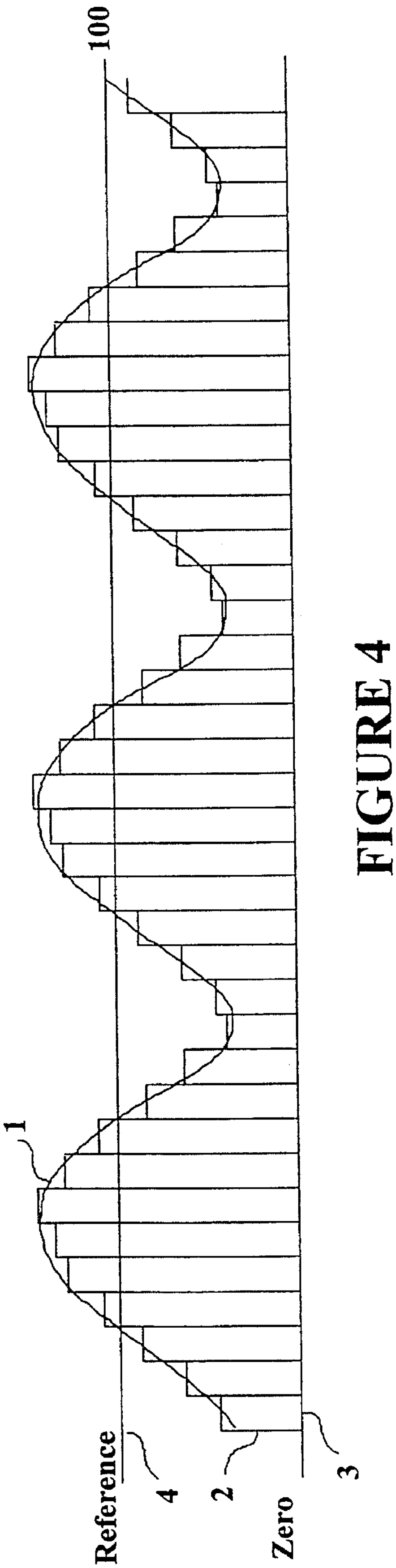
FIG. 4 illustrates a train of samples representing a low information content signal waveform over a period of time.
Figure 5:
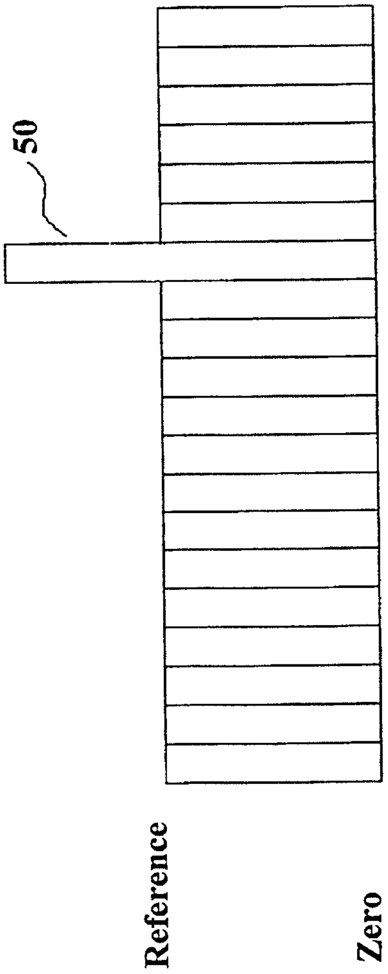
FIG. 5 illustrates the reproduction of a failing cell amongst other properly programmed cells to a ground or reference level.
Figure 6:
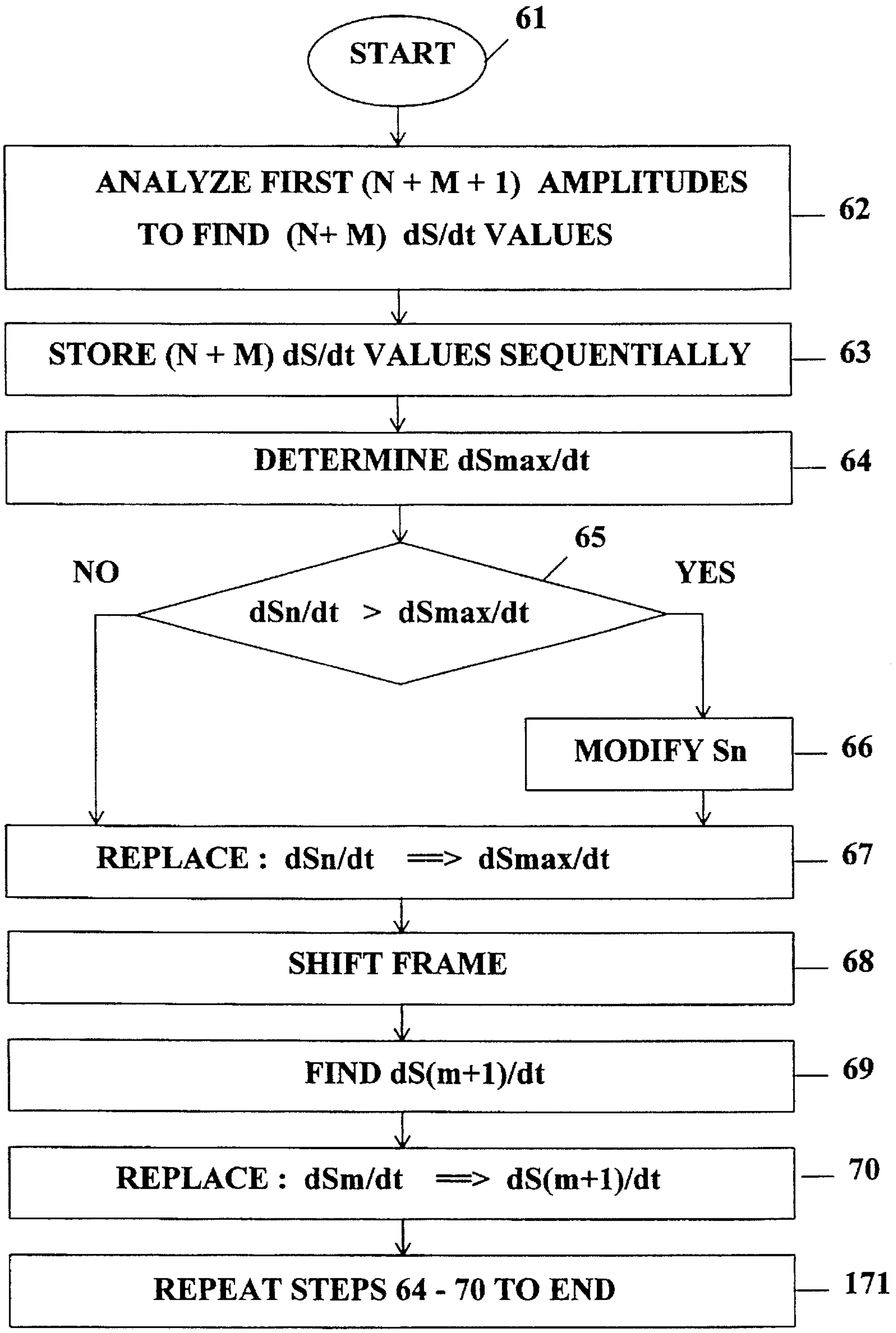
FIG. 6 illustrates a flow diagram of the steps involved in the frame method used to determine the maximum difference value.

A flow diagram illustrating the steps involved in analyzing a stream of data using the second method is illustrated in FIG. 6. The analysis for a sample is started at the block 61. The N samples previous to and the M samples subsequent to the relevant sample are analyzed at the block 62 and the correlated maximum difference value $dS_{max}$/dt for the frame of samples is determined. The difference value for the sample is also determined at the block 62. The N samples previous to and M samples subsequent to the relevant sample, $S_n$, are analyzed in the block 62 to find their respective difference values dS/dt. These difference values are stored sequentially in the block 63. Sequential storage may be in either physical space or logical space to be explained below. The next step in the block 64 is to determine the maximum difference value $dS_{max}$/dt from the values stored in the frame. This value is then compared with the difference value dS/dt for the sample in the block 65. If the difference value dS/dt is greater than the maximum difference value $dS_{max}$/dt, the value of the sample's amplitude $S_n$ is corrected in the block 66. If it was necessary to correct the sample's amplitude $S_n$ then the value of the difference value dS/dt must also be in error. Therefore the difference value dS/dt is replaced with the maximum difference value $dS_{max}$/dt or a value correlated to the maximum difference value $dS_{max}$/dt in the block 67. With or without modification, the next step is to shift the frame as illustrated in the block 68. The method used to shift the frame depends on the method used for sequentially storing the difference values. Either the difference values are held in such a manner that the jth and (j+1)th value are physically concurrent or an address is associated with each difference value dS/dt. If they are physically concurrent then a frame shift would require replacing each difference value dS/dt with the subsequent value. If they are logically concurrent, then a frame shift would entail incrementing each address. Either way the old difference value $dS_n$/dt which is now not in the frame is discarded. The next step, at the block 69, is to find the next difference value $dS_{M+1}$/dt. This then replaces the old difference value $dS_M$/dt in the block 70. In the block 71 the steps 63–69 are repeated for the next sample, until all samples have been analyzed.

A third method that can be used to determine the maximum acceptable level of the difference value dS/dt is to analyze the samples as they are being recorded into the storage device and group them into groups of X samples, using one cell within the storage device for each group to record the maximum difference value $dS_{max}$/dt for the group of X samples. For example, for each row of storage cells within the storage device, a maximum difference value $dS_{max}$/dt could be stored which represents the maximum change in the amplitude between a sample and its neighboring samples within that row. During reproduction of this stream of data, the difference values between each cell and its neighboring cells are then sequentially compared to the stored value for the group. If the difference value dS/dt for that sample is greater than the stored value, the sample is detected as an error and its output level is corrected during playback or reproduction of the stream of data so that the reproduction will more closely mirror the original. For the difference value using this method, the right, left or both difference values dS/dt for each sample can be used.

Figure 7:
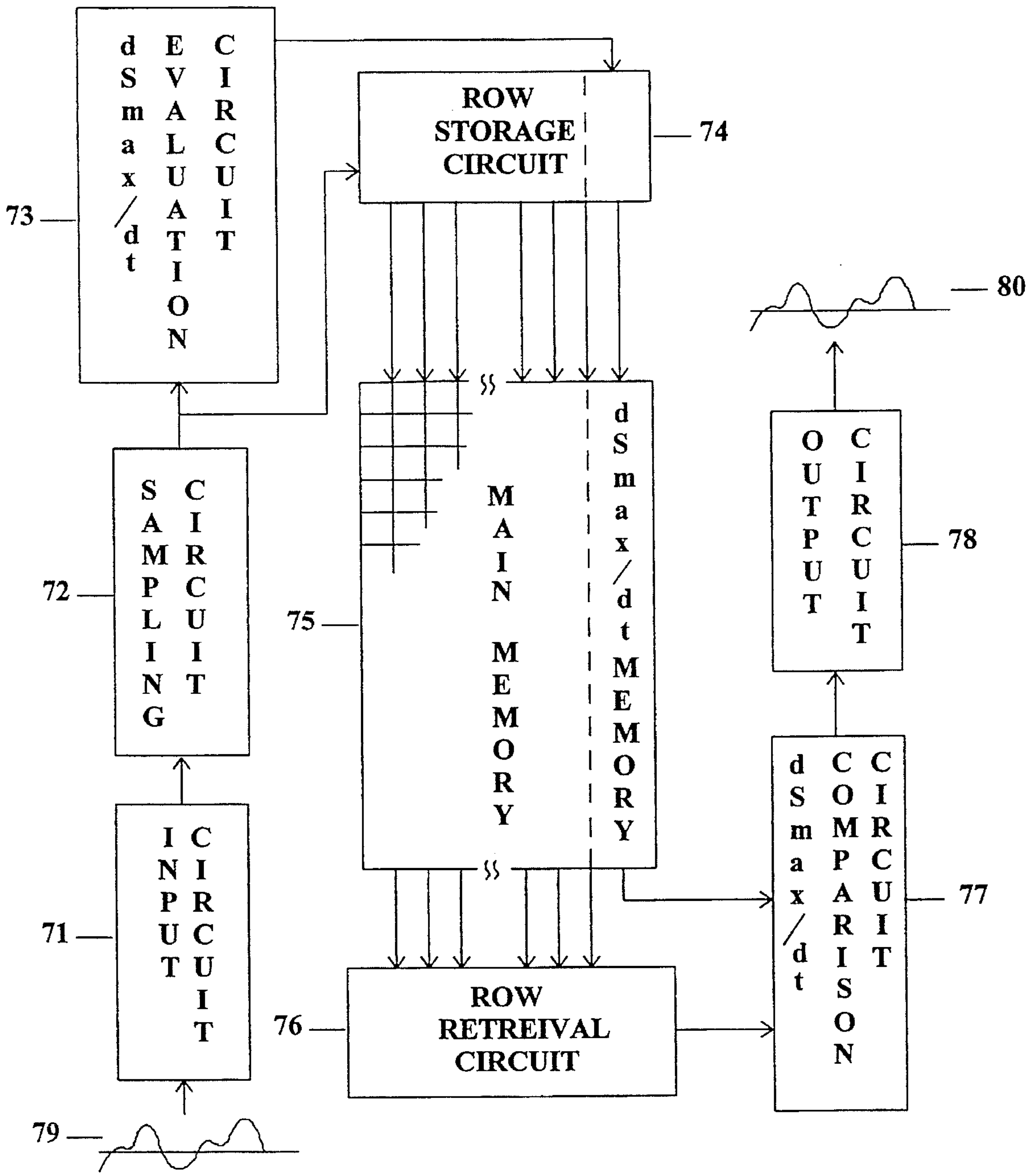
FIG. 7 illustrates a block diagram of a circuit for analyzing samples as they are being recorded, grouping them into groups and storing a maximum difference value for each group.

FIG. 7 is a block diagram of such a device. The input signal 79 is processed and filtered as required by the application by the input circuit 71. The sampling circuit 72 finds the sequential amplitudes at the required sampling frequency and sends these amplitudes to the row storage circuit 74. The sample amplitudes are also analyzed by the maximum difference value $dS_{max}$/dt evaluation circuit 73 which finds a maximum difference value $dS_{max}$/dt for each row and sends this value to the row storage circuit 74. When a row is captured its amplitudes and the maximum difference value $dS_{max}$/dt for that row are written into the main memory 75. When the signal is to be reconstructed and output, the rows are retrieved by a row retrieval circuit 76. This row retrieval circuit 76 outputs the samples sequentially to a comparison circuit 77 that analyses the samples for the difference values dS/dt and compares these with the stored maximum difference value $dS/_{max}$/dt for that row. Any errors are then corrected. The corrected amplitudes are sent to an output circuit 78 for final processing and then the reconstituted signal 80 is output from the device.

Figure 8:
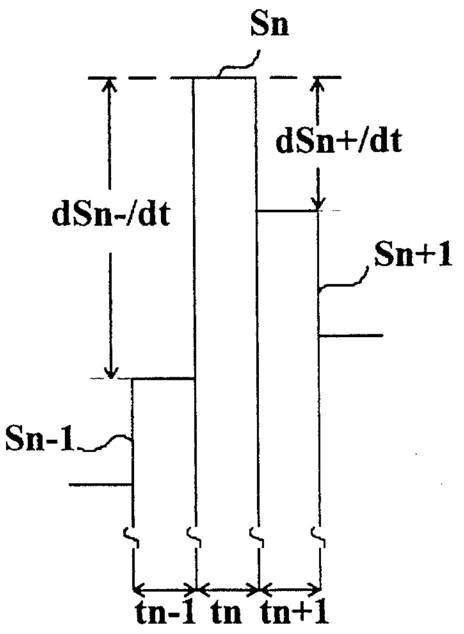
FIG. 8 illustrates local maxima and minima within a stream of data.
Figure 8:
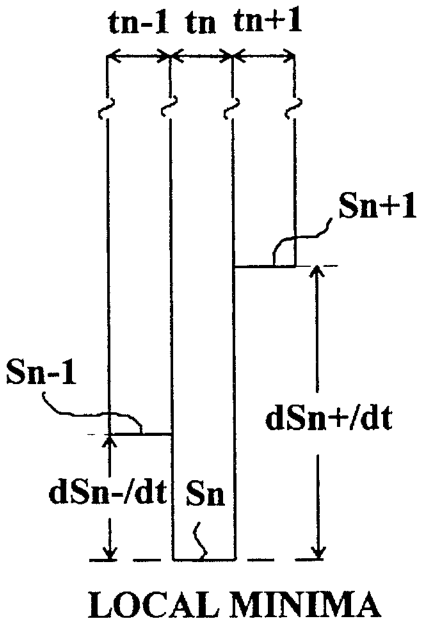

A fourth method that can be used to determine the maximum or minimum acceptable level of the difference value dS/dt is to analyze the difference values dS/dt only for the local minima or maxima of the reproduced waveform. This can be done using the frame method or dividing the samples into groups and storing a value for the group as described above. FIG. 8 illustrates the use of local maxima and local minima to detect errors. To qualify as a local maxima or minima, the magnitude of the amplitude $S_n$ must be greater than the amplitude of the previous sample $S_{n-1}$ and the amplitude of the subsequent sample $S_{n+1}$ or it must be less than the magnitude of the amplitude of the previous sample $S_{n-1}$ and the magnitude of the subsequent sample $S_{n+1}$. In this embodiment the smaller of the two sample difference values, $dS_{n-}/dt$ and $dS_{n+}/dt$, is compared against a maximum difference value $dS_{max}/dt$. If the smaller change is greater than the maximum difference value $dS_{max}/dt$ then that local maxima or minima is modified in such a way that the smaller of the two sample difference values, $dS_{n-}/dt$ or $dS_{n+}/dt$ is no greater than the maximum difference value $dS_{max}/dt$. The maximum difference value $dS_{max}/dt$ can be a fixed value, the largest difference value for a local maxima or minima within a frame or row, or a predetermined amount greater than the largest difference value within a frame or row.

Figure 9:
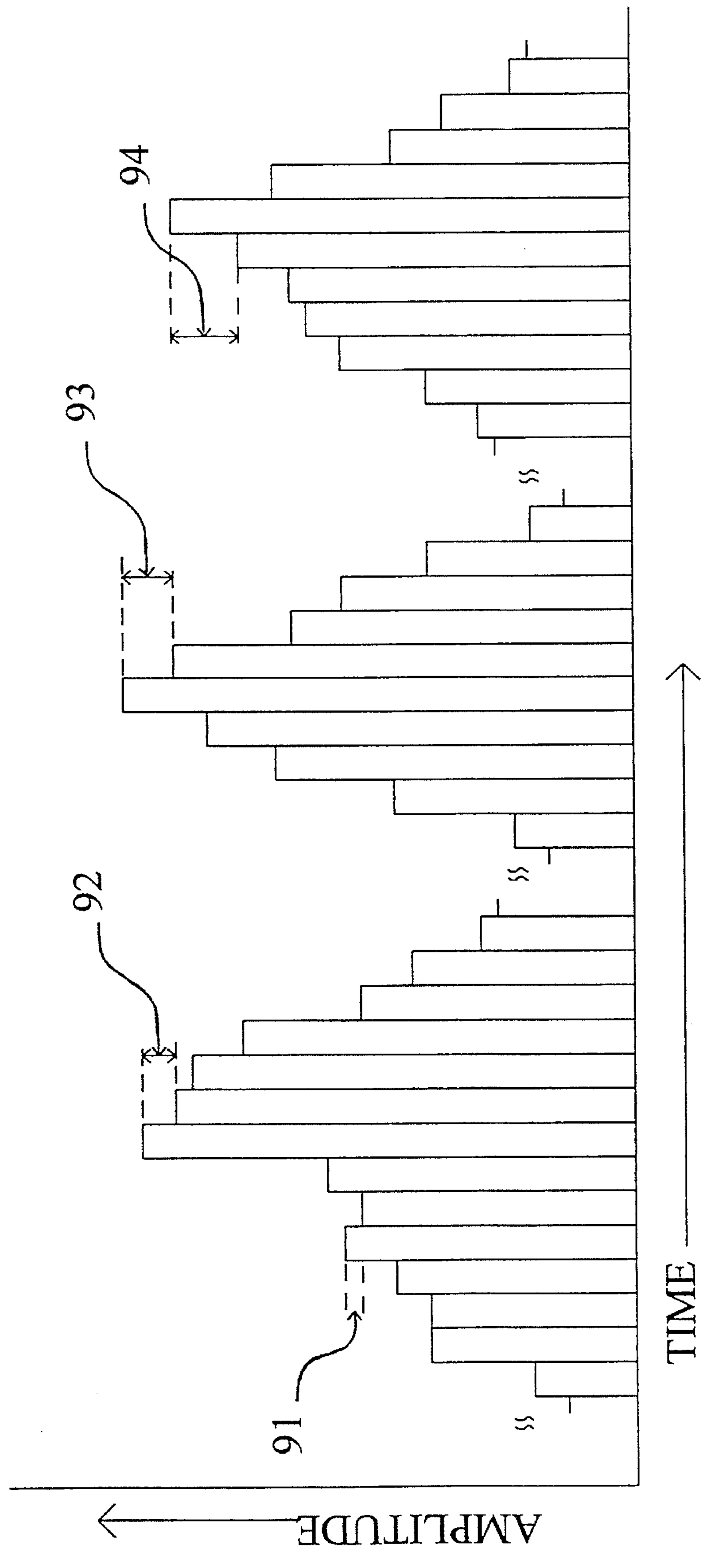
FIG. 9 illustrates several local maxima within a sampled train of data.

This method is advantageous when the signal or data is such that the major cause of distortion is not small changes on the slopes of the signal but large changes at the local maxima and minima as illustrated in FIG. 9. Voice signals have this characteristic. The difference values 91–94 are all examples of local maxima. Local minima would be analyzed in a similar manner. Within these sections of wavetrain, the difference value 94 would be selected as the maximum difference value $dS_{max}/dt$ for comparison with the others. Comparing against the smaller of the two changes in magnitude, $dS_{n-}/dt$ and $dS_{n+}/dt$, better limits the possible error than comparing against the larger change in magnitude, since it is the rise above the nearest presumably non-error sample that will cause most of the distortion in the output signal and it provides a smaller maximum difference value $dS_{max}/dt$ which better limits the distortion caused by an error sample. The magnitude of the maximum difference value $dS_{max}/dt$ may be determined in many ways but, if possible, it is preferred to determine the value from the original sample train. The maximum difference value $dS_{max}/dt$ is taken to be the largest of the smaller changes in magnitude for the section of signal being analyzed. This maximum difference value $dS_{max}/dt$ is then stored to be used during reconstruction of the signal as outlined above. FIG. 9 illustrates several local maxima. Analyzing these local maxima, the difference value $dS_{n-}/dt$ of the local maxima 94 would be selected as the maximum difference value $dS_{max}/dt$.

The preferred method of the present invention uses a combination of the third method and the fourth method. If access to the electrical signal is available when the electrical signal is being input, the local maxima and minima are analyzed as the electrical signal is being input and a difference value is stored for each group of samples. If access to the electrical signal during input is not available, then the preferred method is the second or frame method, which analyzes the difference value dS/dt for each sample and compares it to the difference value dS/dt for a number N of samples previous to and a number M of samples subsequent to the sample. Preferably N and M are equal and ten samples on either side of the sample are being analyzed. While the preferred method of the present invention is to analyze the local maxima and minima as the electrical signal is being input and store a difference value dS/dt for a group of samples, any of the methods described above can be implemented using many techniques as will be apparent to a person of ordinary skill in the art.

Figure 10:
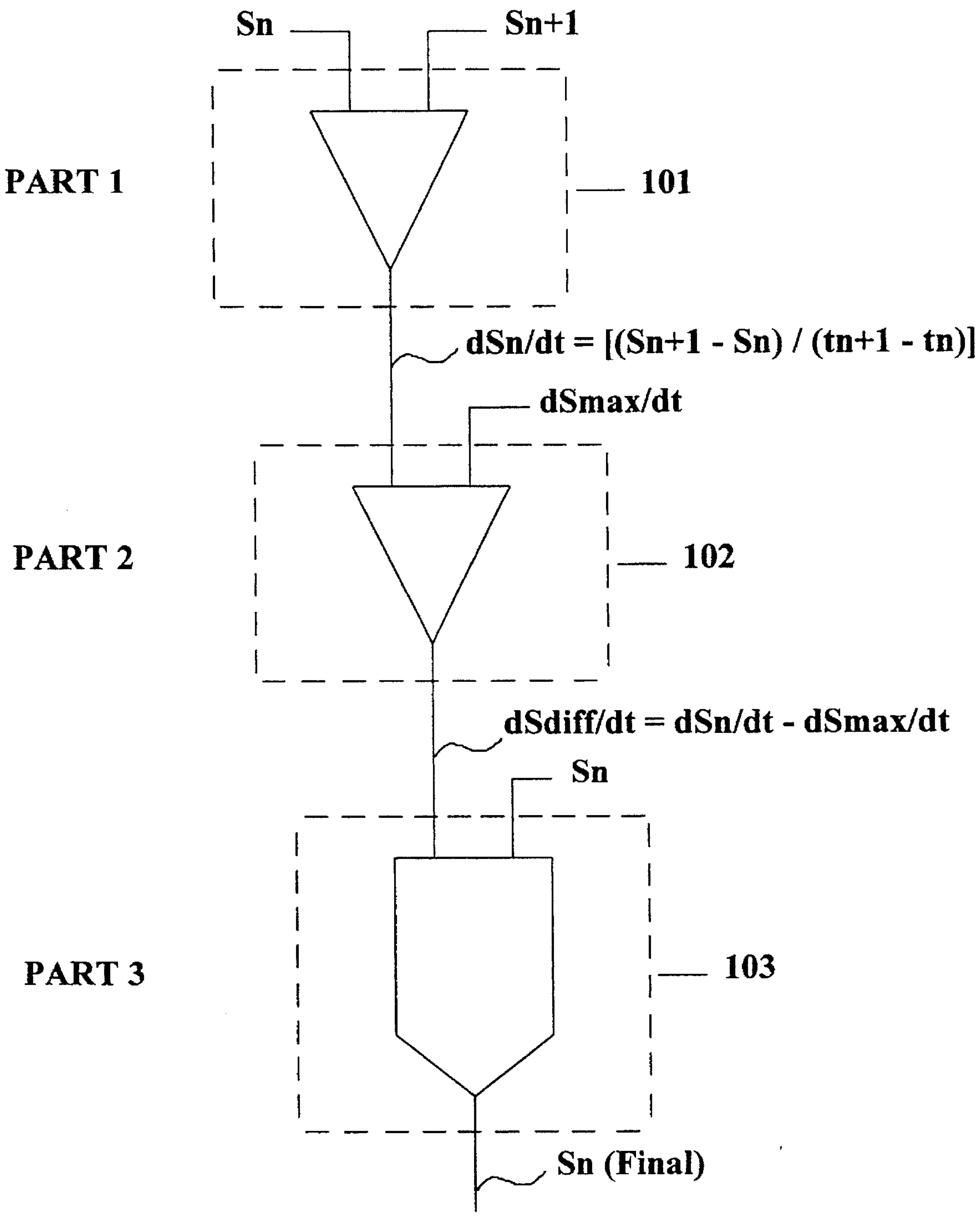
FIG. 10 illustrates a block diagram of the preferred embodiment for the apparatus of the present invention.

The preferred embodiment for the apparatus of the present invention is illustrated in FIG. 10. A first difference circuit 101 compares each time sample amplitude or a representation of each time sample amplitude, $S_n$, with the subsequent time sample amplitude, $S_{n+1}$, to find the difference value dS/dt according to the following formula:

$$\frac{dS}{dt} = \frac{S_{n+1} - S_n}{t_{n+1} - t_n} \quad (1)$$

As described above, because the reference line 4 is used, all of the time sample amplitudes $S_n$ are taken to be positive. The change in time dt is calculated as the time $t_n$ represented by each sample amplitude compared with the time $t_{n+1}$ represented by the subsequent sample amplitude. The absolute value of the difference between the sample amplitude $S_n$ and the subsequent sample amplitude $S_{n+1}$ is used to calculate the difference value dS/dt. As specified above, this implementation and formula would also work if each sample was compared to the previous sample instead of the subsequent sample.

A second difference circuit 102 compares the magnitude of the difference value dS/dt with a maximum difference value $dS_{max}/dt$ determined by any of the methods described above. If the difference value dS/dt is not greater than the maximum difference value $dS_{max}/dt$ then the sample amplitude $S_n$ is not adjusted. If the difference value dS/dt is greater than the maximum difference value $dS_{max}/dt$ then the difference value dSdiff/dt, which is the difference between the difference value dS/dt and the maximum difference value $dS_{max}/dt$, is used by the modification circuit 103 to modify the sample amplitude $S_n$ to obtain an output sample amplitude $S_{nout}$ according to the conditions:

$$S_{n_{out}} = S_n - \frac{dSdiff}{dt} \quad [S_n > S_{n+1}] \quad (2)$$

$$S_{n_{out}} = S_n + \frac{dSdiff}{dt} \quad [S_n < S_{n+1}] \quad (3)$$

Figure 15:
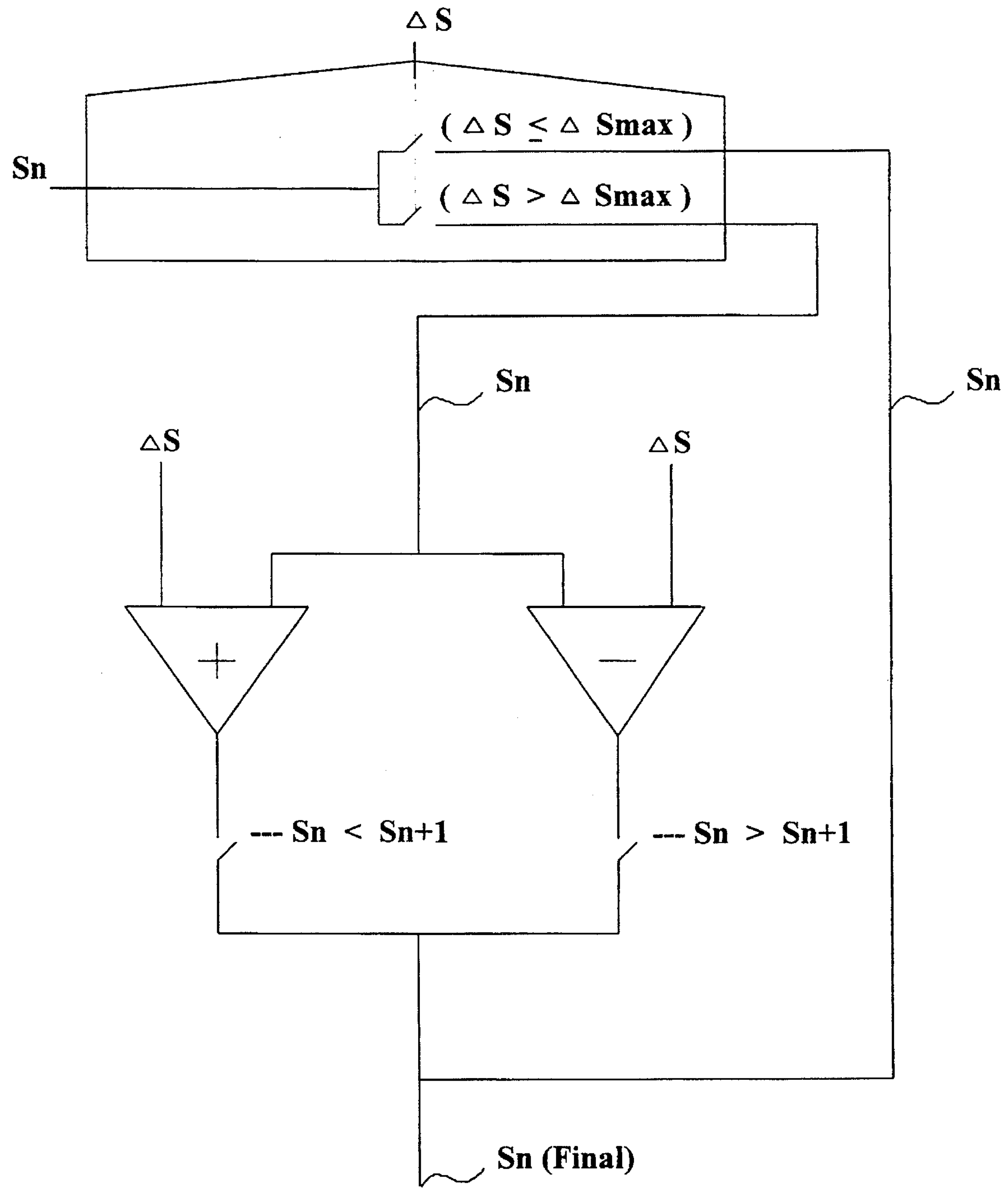
FIG. 15 illustrates a detailed block diagram of the modification circuit of FIG. 10.

A detailed block diagram of the modification circuit 103 is illustrated in FIG. 15. If the sample amplitude $S_n$ is greater than the subsequent sample amplitude $S_{n+1}$, the output sample amplitude $S_{nout}$ is equal to the sample amplitude $S_n$ minus the absolute value of the difference between the difference value dS/dt and the maximum difference value $dS_{max}/dt$. If the sample amplitude $S_n$ is less than the subsequent sample amplitude $S_{n+1}$, the output sample amplitude $S_{nout}$ is equal to the sample amplitude $S_n$ plus the absolute value of the difference between the difference value dS/dt and the maximum difference value $dS_{max}/dt$. The sample could also be eliminated and the two neighboring samples treated as contiguous samples. The amplitude of the sample could also be adjusted to a level that is closer to the amplitude of either neighboring sample.

Figure 16:
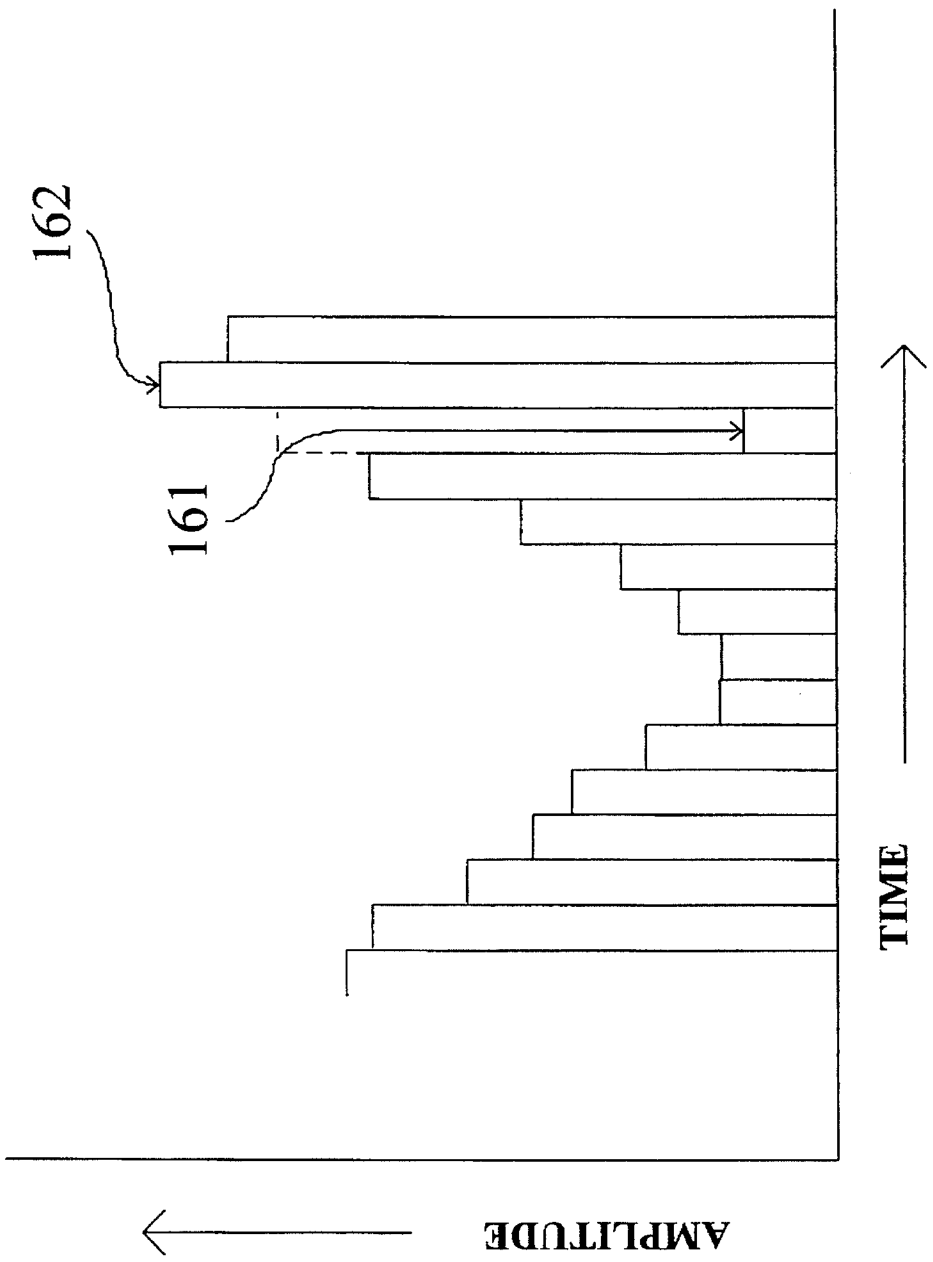
FIG. 16 illustrates a sampled signal waveform including a failing cell.

During output of a signal waveform as illustrated in FIG. 16, the sample amplitudes are read from the cells of the storage device. The difference values dS/dt for each sample are then compared to the maximum difference value $dS_{max}/dt$, determined by one of the above described methods. If the difference value dS/dt for a sample is not greater than the maximum difference value $dS_{max}/dt$ then the sample amplitude is not adjusted. If the difference value dS/dt is greater than the maximum difference value $dS_{max}/dt$, as for the sample 161, then the amplitude of the sample is modified before it is output. Because the sample amplitude $S_n$ for the sample 161 is less than the sample amplitude $S_{n+1}$ for the subsequent sample 162, the condition 3 is used to modify the output sample amplitude by adding the difference value dS/dt to the sample amplitude $S_n$.

In an alternate embodiment of the apparatus of the present invention, the first difference circuit compares each time sample amplitude $S_n$ with both the previous time sample amplitude $S_{n-1}$ and the subsequent time sample amplitude $S_{n+1}$, as illustrated in the FIGS. 11 and 12, to find the difference values $dS_{n-}/dt$ and $dS_{n+}/dt$ respectively, according to the following formulas:

$$\frac{dS_{n-}}{dt} = \frac{S_n - S_{n-1}}{t_n - t_{n-1}} \quad (4)$$

$$\frac{dS_{n+}}{dt} = \frac{S_{n+1} - S_n}{t_{n+1} - t_n} \quad (5)$$

The second difference circuit in this alternate embodiment then compares each of the difference values $dS_{n-}/dt$ and $dS_{n+}/dt$ to maximum difference values $dS_{n-}max/dt$ and $dS_{n+}max/dt$, respectively, where the maximum difference values $dS_{n-}max/dt$ and $dS_{n+}max/dt$ are determined by any of the methods described above. If the difference values $dS_{n-}/dt$ and $dS_{n+}/dt$ are not greater than their respective maximum difference values $dS_{n-}max/dt$ and $dS_{n+}max/dt$, the sample amplitude is not adjusted. If one of the difference values $dS_{n-}/dt$ and $dS_{n+}/dt$ is greater then their respective maximum difference values $dS_{n-}max/dt$ and $dS_{n+}max/dt$ then the sample amplitude $S_n$ is modified.

Figure 13:
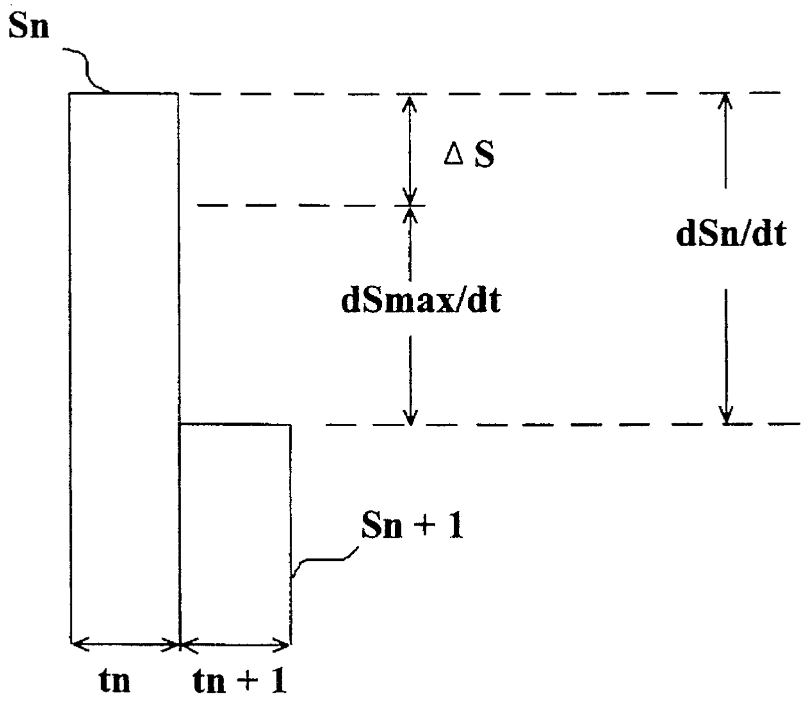
FIG. 13 illustrates descending time sample amplitude values.
Figure 14:
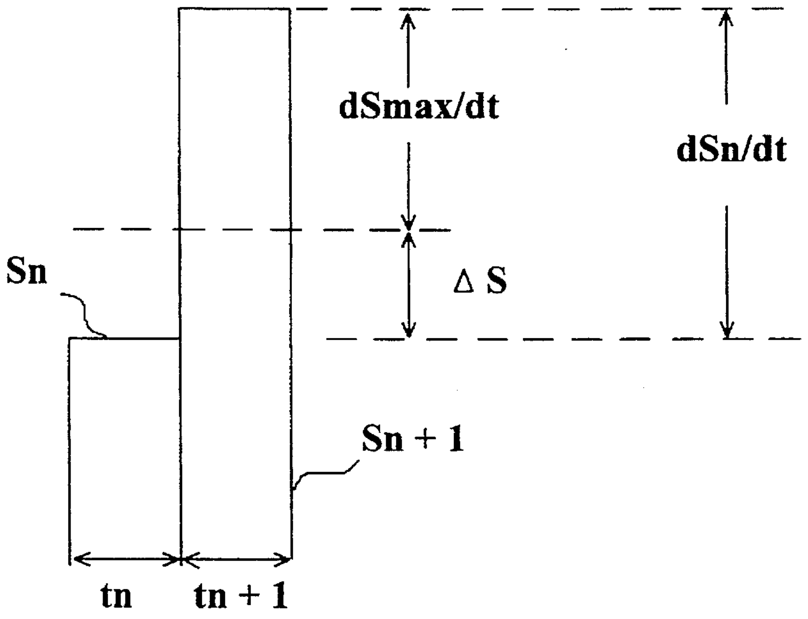
FIG. 14 illustrates ascending time sample amplitude values.

In another alternate embodiment, several maximum difference values can be used, depending on whether the present time sample is part of an ascending side or descending side of the waveform. Therefore, one maximum difference value $dS_{max}/dt$ can be used to compare with the difference values that are derived from descending time sample amplitude values $S_n$, as illustrated in FIG. 13, and another maximum difference value $dS_{max}/dt$ can used to compare with the difference values that are derived from ascending time sample amplitude values $S_n$, as illustrated in FIG. 14. A zero crossing point may also be utilized, yielding both positive and negative time sample amplitude values $S_n$ with respective difference values dS/dt and maximum difference values $dS_{max}/dt$.

In the preferred embodiment of the present invention, the sample amplitude error detection and correction circuit is implemented in an integrated circuit used to store voice or sound. The sample amplitude error detection and correction circuit is coupled to detect and correct errors in the sample amplitudes from the storage cells during playback of a stored sound signal. However, the application of the present invention is not limited to integrated circuit and storage device applications. The sample amplitude error detection and correction circuit can also be used in the synthesis or transmission of any low information content signals, including but not limited to voice, music, sound, and handwriting data.

The present invention has been described in terms of specific embodiments incorporating details to facilitate the understanding of the principles of construction and operation of the invention. Such reference herein to specific embodiments and details thereof is not intended to limit the scope of the claims appended hereto. It will be apparent to those skilled in the art that modifications may be made in the embodiment chosen for illustration without departing from the spirit and scope of the invention.

I claim:

1. An apparatus for ensuring none of a plurality of samples, each sample having a value and representing a finite time duration of an electrical signal, falls outside a difference threshold range comprising means for comparing each sample to a neighboring sample for forming a difference value, means for comparing the difference value to the difference threshold and means for adjusting the value of the sample such that the difference value is reduced so that it is no greater than the difference threshold, wherein the difference threshold is determined for a group of samples by analyzing the electrical signal and further wherein the difference threshold for each group of samples is stored and transmitted with the group of samples.

2. The apparatus as claimed in claim 1 wherein the difference threshold is a constant value for the entire electrical signal and is determined based on characteristics of the electrical signal.

3. The apparatus as claimed in claim 1 wherein the means for adjusting adjusts the value of the sample to a level equal to a level of a neighboring sample.

4. The apparatus as claimed in claim 1 wherein the means for adjusting adjusts the value of the sample to a level at which the difference value for the sample will equal the difference threshold.

5. The apparatus as claimed in claim 1 wherein each group of samples is a row within a computer memory and the difference threshold is stored as a value within the row.

6. The apparatus as claimed in claim 1 wherein the difference value for a group of samples is determined by analyzing a local minima sample.

7. The apparatus as claimed in claim 1 wherein the difference value for a group of samples is determined by analyzing a local maxima sample.

8. A sample amplitude error detection and correction circuit for detecting and correcting errors of an electrical signal having a plurality of samples, each sample having an amplitude, the circuit comprising:

a. means for calculating a difference value for each local minima sample by calculating a value of a difference between the amplitude of each local minima sample and an amplitude of a neighboring sample;

b. means for receiving the difference value for each local minima sample and comparing it to a threshold difference value for determining if the difference value exceeds the threshold difference value; and c. means for modifying the amplitude of the local minima sample if the difference value for the local minima sample exceeds the threshold difference value, the means for modifying coupled to the means for receiving.

9. The circuit as claimed in claim 8 wherein the threshold difference value for a local minima sample is determined as a smaller value of either the difference value between a sample preceding the local minima sample and the local minima sample or the difference value between a sample subsequent to the local minima sample and the local minima sample.

10. The circuit as claimed in claim 9 wherein the means for modifying the local minima sample adjusts the value of the local minima sample so that the difference between the sample value and the difference value is no greater than the threshold difference value.

11. The circuit as claimed in claim 9 wherein the threshold difference value is a fixed value.

12. The circuit as claimed in claim 9 wherein the threshold difference value for a group of samples is greater than or equal to a greatest difference value between a local minima and an adjoining sample.

13. The circuit as claimed in claim 8 wherein the threshold difference value for a group of local minima samples is determined by analyzing the electrical signal and further wherein the threshold difference value for each group of samples is stored and transmitted with the group of samples.

14. A method for detecting and correcting errors within an electrical signal having a plurality of samples, each sample having an amplitude, comprising the steps of:

a. calculating a difference value for each sample by calculating a value of a difference between the amplitude of each sample and an amplitude of a neighboring sample;

b. receiving the difference value for each sample and comparing it to a threshold difference value, wherein the threshold difference value is a predetermined value for a group of samples and is stored with the group of samples; and c. modifying the amplitude of the sample if the difference value for the sample exceeds a threshold difference value.

15. The method as claimed in claim 14 wherein the threshold difference value is a constant value for the entire electrical signal and is determined based on characteristics of the electrical signal.

16. The method as claimed in claim 14 wherein the threshold difference value is determined by analyzing M samples previous to and N samples subsequent to the sample.

17. The method as claimed in claim 14 wherein the threshold difference value is determined for a group of samples by analyzing an original electrical signal.

18. The method as claimed in claim 14 wherein the difference value for each sample is calculated from the difference between the amplitude of each sample and a sample immediately preceding it.

19. The method as claimed in claim 14 wherein the difference value for each sample is calculated from the difference between the amplitude of each sample and a sample immediately following it.

20. The method as claimed in claim 14 wherein the difference value for each sample is calculated using the difference between the amplitude of each sample and samples immediately preceding and following it.

21. A sample amplitude error detection and correction circuit for detecting and correcting errors of an electrical signal having a plurality of samples, each sample having an amplitude, the circuit comprising:

a. means for calculating a difference value for each local maxima sample by calculating a value of a difference between the amplitude of each local maxima sample and an amplitude of a neighboring sample;

b. means for receiving the difference value for each local maxima sample and comparing it to a threshold difference value for determining if the difference value exceeds the threshold difference value; and c. means for modifying the amplitude of the local maxima sample if the difference value for the local maxima sample exceeds the threshold difference value, the means for modifying coupled to the means for receiving.

22. The circuit as claimed in claim 21 wherein the difference value for a group of samples is determined for each local maxima sample of the sampled waveform as the smaller of the difference between the sample preceding the local maxima sample and the local maxima sample and the difference between the sample following the local maxima sample and the local maxima sample.

23. The circuit as claimed in claim 22 wherein the means for modifying the local maxima sample adjusts the value of the sample so that a difference between the sample value and the difference value is no greater than the threshold difference value.

24. The circuit as claimed in claim 23 wherein the threshold difference value is a fixed value.

25. The circuit as claimed in claim 23 wherein the threshold difference value for a group of samples is greater than or equal to a greatest difference value between a local maxima and an adjoining sample.

26. The circuit as claimed in claim 21 wherein the difference value for a group of local maxima samples is determined by analyzing the electrical signal and further wherein the threshold difference value for each group of samples is stored and transmitted with the group of samples.

* * * * *